United States Patent
Penn (12)

(10) Patent No.: US 6,433,340 B1
(45) Date of Patent: Aug. 13, 2002

(54) LOW ENERGY RADIATION DETECTOR

(75) Inventor: David G. Penn, Woodmere, OH (US)

(73) Assignee: Saint-Gobain Industrial Ceramics, Inc., Worcester, MA (US)

(*) Notice: Subject to any disclaimer, the term of this patent is extended or adjusted under 35 U.S.C. 154(b) by 39 days.

(21) Appl. No.: 09/609,689

(22) Filed: Jul. 5, 2000

Related U.S. Application Data

(60) Provisional application No. 60/147,632, filed on Aug. 6, 1999.

(51) Int. Cl.$^7$ .............................. G01T 1/169; G01T 1/20
(52) U.S. Cl. ............................... 250/361 R; 250/472.1; 250/253
(58) Field of Search .................... 250/361 R, 483.1, 250/472.1, 370.11, 253

(56) References Cited

U.S. PATENT DOCUMENTS 5,426,305 A   6/1995   Siebentritt, Jr. et al.
5,637,882 A * 6/1997   Divigalpitiya et al. ...... 250/580

FOREIGN PATENT DOCUMENTS

WO     WO 97 03369     1/1997

OTHER PUBLICATIONS

Visvikis D. et al: "A solid state detector for intraoperative imaging", Nuclear Science Symposium, 1998. Conference Record. 1998 IEEE Toronto, Ont., CANADA Nov. 18–14 1998, Piscataway, NJ, USA, IEEE, US, Nov. 8 1998, pp. 1295–1299, XP010338328, ISNB: 0–7803–5021–9.

* cited by examiner

Primary Examiner—Scott J. Sugarman
Assistant Examiner—Richard Hanig
(74) Attorney, Agent, or Firm—Volker R. Ulbrich

(57) ABSTRACT

A low energy radiation detector for wireline applications and the like is provided with a housing made of carbon fiber and eopxy binder composite which is relatively transparent to x-radiation, while also being optically opaque and providing an hermetic enclosure for a scintillation crystal disposed inside the housing. Also disclosed is a neutron detector having such a housing.

13 Claims, 2 Drawing Sheets

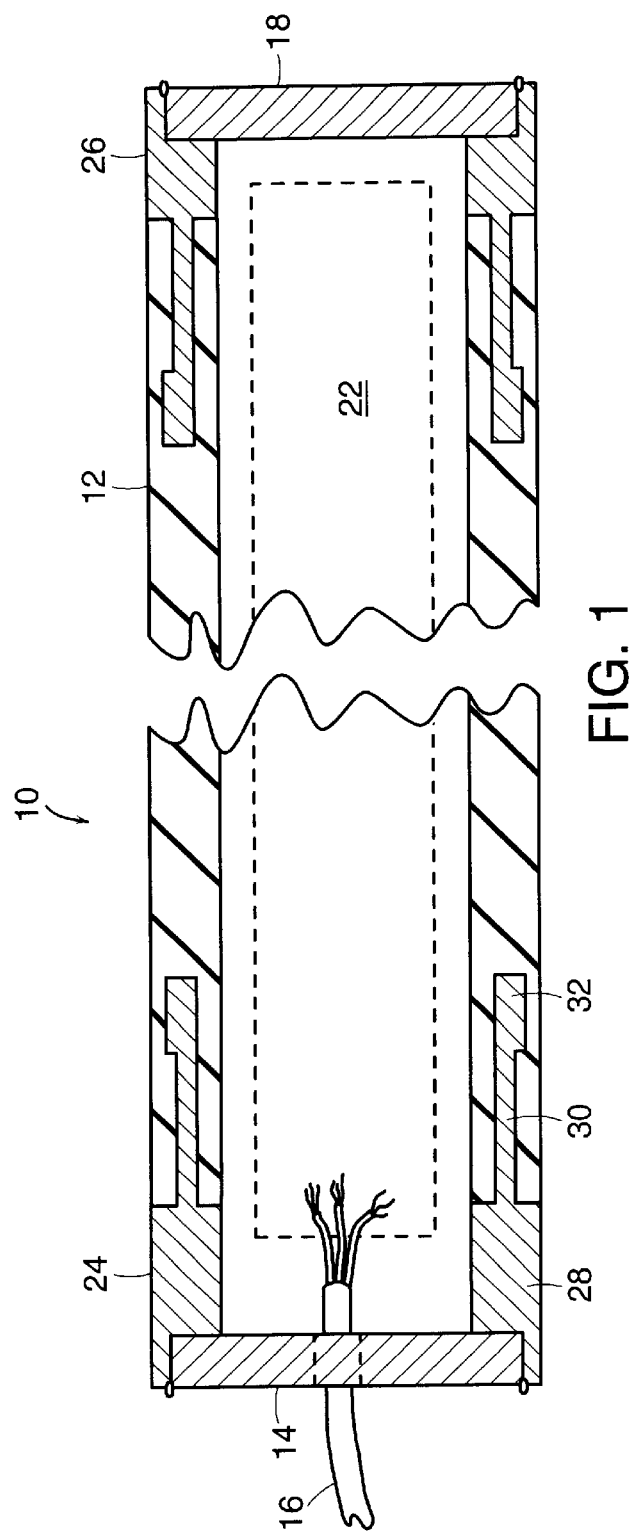
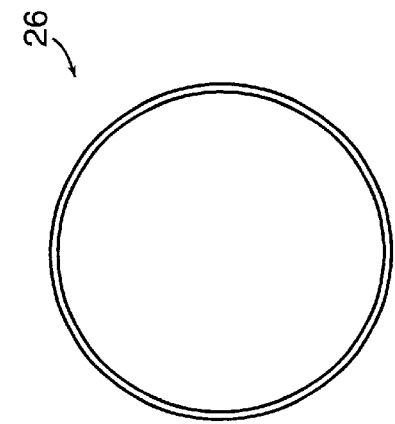
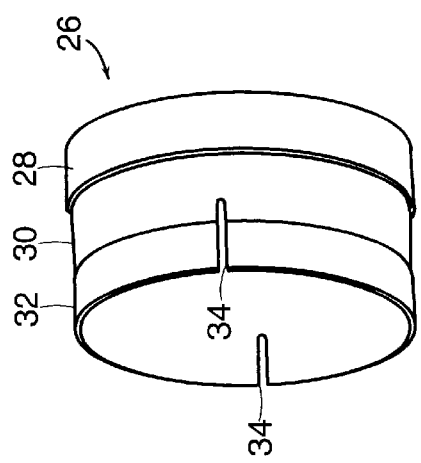

LOW ENERGY RADIATION DETECTOR

CROSS-REFERENCE TO RELATED APPLICATIONS

This application claims the benefit of the copending provisional application No. 60/147,632 filed Aug. 6, 1999.

FIELD OF THE INVENTION

The invention relates to radiation detectors generally, and relates more particularly, but not exclusively, to such detectors as are used for detecting low energy radiation. BACKGROUND OF THE INVENTION The term "radiation" as used herein refers to any type of ionizing radiation of various energies. By "low" energy radiation is meant radiation having energies below $3 \times 10^5$ eV (electron Volts).

Radiation detectors are used in medicine, industry, and research to obtain structural information. Materials transmit and absorb radiation energies in different ways. These differences may be used to gain valuable insight into the nature of the material through which the radiation has passed. A radiation detector typically converts the radiation to visible light, which may then be converted further to an electrical signal and appropriately processed to yield the desired information.

One common type of radiation detector is a geophysical wireline logging type which is lowered into the bore of a well to gain information about the well condition and the properties of the surrounding geological formations. An example of such a detector is described in U.S. Pat. No. 5,070,249 entitled "Photomultiplier Tube Mounting for Well Logging Detectors" issued Dec. 3, 1991 to J. A. White and U.S. Pat. No. 5,744,803 entitled "Radiation Detector Assembly and Method with Discrimination Between Vibration and Radiation Induced Events" issued Apr. 28, 1998 to C. M. Grodsinsky, both assigned to the present successor assignee. Such detectors have a cylindrical metal housing in which there is disposed a scintillation crystal coupled to a photomultiplier tube (PMT). Radiation passes through the wall of the housing into the crystal. There it is converted to visible light which passes to the PMT for conversion into an amplified electrical signal. The signal is led out of the housing and up a wire to a receiving station for processing and interpretation.

Another type of detector is placed at the outside surface of a well output pipe in order to gain spectral information about the fluids flowing in it by sensing low energy radiation which has passed from a source through the fluids. The information can be used to determine fluid constituent proportions and flow parameters.

The housing of a geophysical logging detector is generally a rugged metal cylinder, typically of stainless steel or aluminum, which is hermetically sealed at both ends by end caps in order to protect the internal components from contamination and mechanical damage. These metals and some others are relatively transparent to most of the radiation of interest. However, they are not very transparent to low energy radiation—gamma and x-rays. In order for it to pass a sufficient fraction of such low energy radiation, it would be necessary to make the metal of the housing so thin that it would become very subject to mechanical deformation in use and also unreliable in preventing contamination of its internal components by fluid intrusion.

There is therefore a need for a detector with a housing which is hermetically reliable and highly transparent to low energy radiation while also being at the same time opaque to light and sufficiently mechanically rugged to be able to withstand the down-hole wireline environment.

SUMMARY OF THE INVENTION

In accordance with the present invention a radiation detector is provided with a housing having a laminated carbon fiber composite wall which is opaque, hermetically reliable, mechanically rugged, and highly transparent to even low energy ionizing radiation.

BRIEF DESCRIPTION OF THE DRAWINGS

FIG. 1 is a front, sectional, diagrammatic view of a radiation detector in accordance with a preferred embodiment of the present invention.

FIG. 2 is a perspective view of a ferrule of the housing of the detector of FIG. 1.

FIG. 3 is and end view of the ferrule of FIG. 2

DETAILED DESCRIPTION

Figure 4:
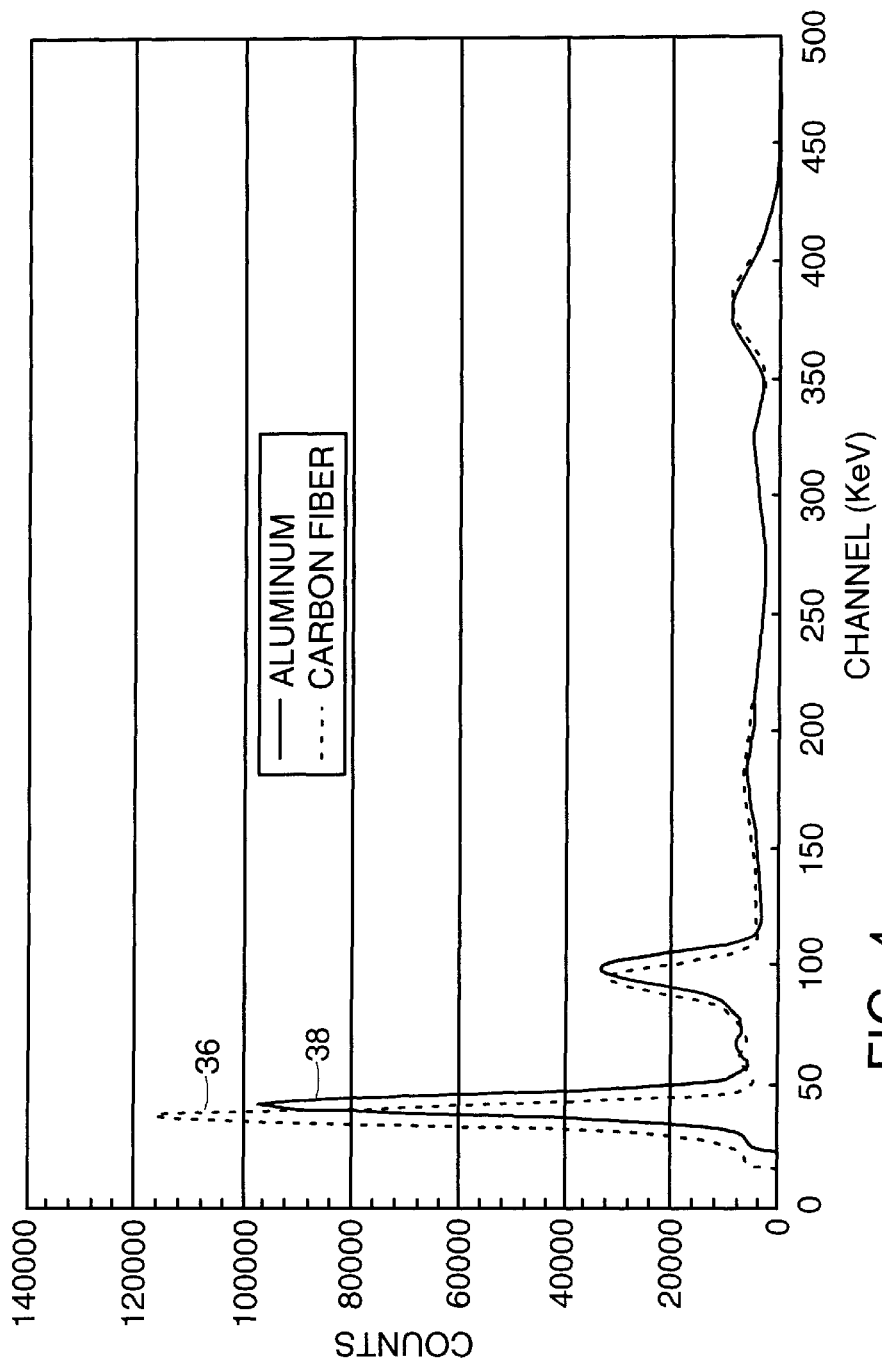
FIG. 4 is a graphical representation of the comparative sensitivity of the detector of FIG. 1.

A preferred embodiment of the present invention is the detector 10 illustrated in FIG. 1. The detector 10 includes an opaque housing tube 12 closed at its tail end by a metal end cap 14 through which pass a number of electrical connection wires 16. The head end of the housing 10 is closed by a second metal end cap 18. Inside the housing are internal detector components 20 outlined by the broken line 22 which are well known in the art, do not form part of the invention, and will therefore not be described in detail. The internal components 20 include a photomultiplier tube (PMT) located near the tail end and a scintillating crystal located near the head end.

The housing tube 12 is constructed of an opaque carbon fiber composite material 24, such as a woven carbon fiber composite with a heat-cured epoxy binder. Such material is commercially available from numerous sources in sheet or tape form, pre-impregnated with uncured and heat-curable epoxy resin binder or as fabric to which binder is added later. Such material is commercially available from, for example, Newport Adhesives and Composites, Inc., 1822 Reynolds Avenue, Irvine, Calif. At each end of the housing tube 12 is a metal ferrule 24,26 which is bonded to its respective end cap 14,18 by welding, brazing, or the like to form a reliable hermetic seal.

The ferrules 24, 26, one of which is shown in more detail in FIGS. 2 and 3, have a thickened outer end segment 28, a thinner center segment 30, and a slightly thickened inner end segment 32. A pair of slots 34 are cut into the center and inner segments.

The manufacturing of the housing 10 is accomplished with the aid of a cylindrical form or mandrel. A single layer of uncured carbon composite sheet is first wrapped tightly about the mandrel. The two ferrules 24,26 are then installed spaced from each other and overlapping the ends of the composite sheet up to the beginning of the outer segments. The uncured carbon composite sheet about 2.5 mm thick is then wrapped around the mandrel several times more, this time overlapping the inner and center segments 32,30 of the ferrules 24,26, until the wall is sufficiently opaque and the correct outside diameter and is achieved. In the case of the detector 10, this results in wall thickness of about 11.25 mm. This leaves the ferrules overlapped by the carbon composite sheet material about a distance of one inch and protruding from it at the ends a distance of about one-quarter inch. Heat shrinkable oriented polyester tape or tubing is placed over at least that portion of the assembly which includes the uncured composite sheet. Such heat-shrinkable tape is commercially available, for example, from Richmond Aircraft Products, 13503 Pumice St., Norwalk, Calif. The entire assembly is then baked in an oven at 150° C. for about one hour for curing. During the curing the heat shrinkable tape or tubing is in compression against the assembly to provide a uniform distribution of the binder. Some of the binder migrates into the slots 34 of the ferrules 24,26 to later lock them in place against torsional loads about the longitudinal axis of the detector 10. When the curing cycle is complete, the assembly is cooled to room temperature, the heat shrinkable tape or tubing removed, and the mandrel, which may be of the expandable type, is withdrawn from the interior.

The cured housing tube 12 is now further baked in an oven at 225° C. for several days to accelerate the evaporation of any constituents in the piece that could attack the scintillation crystal of the internal components over time and reduce the detector's lifetime performance. It is then subjected to a helium test at $10^{-6}$ Torr to check for leaks. Thereafter, the internal components 20 are installed and the end caps 14,18 welded to the outer lip of the ferrules 26.

The performance of the detector 10 is shown in FIG. 4 of the drawings, which is a histogram of the signal counts detected by each of a first detector with a conventional aluminum tube housing of thickness 1.02 mm and a second detector such as the detector 10 with a graphite composite tube housing. The ordinate represents the number of counts per unit time. The abscissa represents the energy in keV of the radiation which initiated the count. The detectors were exposed to a Barium-133 radiation source and spectra normalized at 356 keV (channel 356) peak. The spectra were normalized at the 356 keV peak by being scaled so that the number of signal counts in the 365 keV peak for both spectra were equal, in order to show the relative performance gain at lower energies. The broken line plot 36 represents the counts of the graphite composite detector. The solid line plot 38 represents the counts of the aluminum housing detector exposed to the same radiation event conditions.

It can be seen that at the low energies below 50 keV the carbon fiber composite detector 10 has a greater sensitivity than the aluminum tube detector. This is due to the greater transmission of such low energies through the carbon fiber composite material housing wall. Only very thin aluminum about one-third as thick as the carbon fiber composite has comparable transmission to such energies. Such thin aluminum would, however, make the detector housing tube easily subject to mechanical damage and therefore unable to protect the interior components from either mechanical damage or gas intrusion. The carbon fiber composite tube housing, on the other hand, is very rugged mechanically and also maintains its hermetic integrity. Moreover, it effectively blocks stray light. The temperatures in which it will successfully perform depend upon the softening temperature of the binder which is used for the composite. In the case of epoxy resins, temperatures as high as 150° C. can be tolerated. This is sufficient for most wireline applications. If a higher temperature tolerance is required, other binders, such as polyimide may be used for the composite. While the carbon fibers of the housing tube of the detector 10 are in the form of a square weave cloth, they could also be in other weaves or other forms, such as roving, chopped strand, non-woven cloth, etc. The various structural characteristics associated with different carbon fibers and the forms in which they are used are generally familiar to those skilled in the art. The thickness of the tube housing wall is a matter of choice, based on the mechanical, light blocking, and other appropriate requirements for the particular application.

The fabrication of the tube housing as described above permits the tube housing to have either a circular or a non-circular cross-section with minimal increased cost, since it is merely necessary to construct a mandrel with the desired shape. For example, it may be desirable to provide a contour on some portion of the tube housing which better adapts the detector for attachment to some surface. It may also be desired to design the tube housing in a particular configuration to reduce the flow resistance of a fluid in which it might be immersed. Other reasons for a tube housing with a non-circular cross-section may present themselves.

Figure 5:
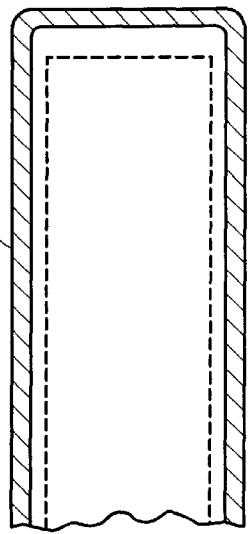
FIG. 5 is a front, sectional diagrammatic view of a portion of another form of a detector housing in accordance with another embodiment of the invention.

For further increasing the sensitivity of a detector for low energy radiation, it may be desirable to eliminate the metal end cap which is near the scintillator portion of the internal components and substitute and end cap of carbon fiber composite which is a continuation of the carbon fiber composite tube housing. This would permit even more radiation to enter the crystal. A portion of the housing 40 of such a detector is illustrated in FIG. 5. Alternatively, the ferrules 26 could be also made of molded carbon composite with the ferrule at the scintillator end being provided with an integral end cap of carbon fiber composite bonded to it with resin.

While the internal components of the detector 10 include a photomultiplier and may also include an electronics package for the photomultiplier, a detector in accordance with the invention may also lack such components and include only a scintillator element, such as a crystal, and a transparent end cap or other window for transmitting the scintillation light to the outside of the housing to other receiving equipment.

While the invention has been discussed above in terms of wireline detectors containing scintillation crystals, it also has application to other types of detectors, such as gas-filled wireline detectors by providing them with a carbon composite housing for low energy detection. Gas-filled detectors are used in the fields of level gauging, health physics, and oil logging. Furthermore, detectors for various ambient radiation monitoring purposes which incorporate Geiger-Mueller tubes having beryllium entrance windows can also benefit from the invention by replacement of the beryllium entrance window with a carbon fiber composite entrance window or, alternatively, providing the Geiger-Mueller tube with an entire housing of carbon composite permeable to low energy radiation. The carbon composite in accordance with the present invention in such applications permits more freedom in the design geometry of radiation detector windows and housings while providing hermetic integrity, structural rigidity, and opaqueness.

What is claimed is:

1. A radiation logging detector, comprising:
    a housing having a wall made of a predominantly carbon fiber composite material with a binder capable of withstanding temperatures of at least 150 degrees Fahrenheit and sufficiently thick to withstand a downhole logging environment, and
    a radiation-sensitive conversion device inside the housing for converting ionizing radiation passing from outside the housing to an electrical signal.

2. The detector or claim 1 wherein the conversion device is a scintillation body which converts x-rays to visible light.

3. The detector of claim 2 wherein the scintillation body is a scintillation crystal.

4. The detector of claim 3 wherein the scintillation crystal is of activated sodium iodide.

5. The detector of claim 4 wherein the sctintillation crystal is of thallium-activated sodium iodide.

6. The detector of claim 1 wherein the carbon fiber of the composite material is a woven material.

7. The detector of claim 6 wherein the carbon fiber of the composite material is a square weave material.

8. The detector of claim 7 wherein the composite material has a heat-curable epoxy binder.

9. The detector of claim 8 wherein the housing has a general geometry of a cylinder segment.

10. The detector of claim 9 wherein the housing has a general geometry of a right, circular cylinder segment.

11. A radiation logging detector, comprising:

a housing having a wall made of a predominantly carbon fiber composite material thick to withstand a downhole logging environment;

a scintillating body inside the housing, the scintillating body being for converting ionizing radiation passing from outside the housing into the scintillating body to light, and a light-sensitive device optically coupled to the scintillating body for converting the light to an electrical signal.

12. The radiation detector of claim 11 in which the light-sensitive device is a photomultiplier device.

13. The radiation detector of claim 12 in which the light-sensitive device is a photomultiplier tube.

* * * * *